(12) United States Patent
Chaji

(10) Patent No.: US 12,523,872 B2
(45) Date of Patent: Jan. 13, 2026

(54) AR SYSTEM WITH HYBRID DISPLAY

(71) Applicant: VueReal Inc., Waterloo (CA)

(72) Inventor: Gholamreza Chaji, Waterloo (CA)

(73) Assignee: VueReal Inc., Waterloo (CA)

( * ) Notice: Subject to any disclaimer, the term of this patent is extended or adjusted under 35 U.S.C. 154(b) by 166 days.

(21) Appl. No.: 18/554,229

(22) PCT Filed: Apr. 6, 2022

(86) PCT No.: PCT/CA2022/050519
§ 371 (c)(1),
(2) Date: Oct. 6, 2023

(87) PCT Pub. No.: WO2022/213190
PCT Pub. Date: Oct. 13, 2022

(65) Prior Publication Data
US 2025/0076646 A1    Mar. 6, 2025

Related U.S. Application Data

(60) Provisional application No. 63/171,195, filed on Apr. 6, 2021.

(51) Int. Cl.
*G02B 27/01* (2006.01)
(52) U.S. Cl.
CPC ................ *G02B 27/0101* (2013.01)

(58) Field of Classification Search
CPC .................................... G02B 27/0101
USPC ........................................... 359/630
See application file for complete search history.

(56) References Cited

U.S. PATENT DOCUMENTS

| | | | |
|---|---|---|---|
| 2013/0285537 A1* | 10/2013 | Chaji | H10K 59/353 445/24 |
| 2018/0252925 A1 | 9/2018 | Schowendgerdt | |
| 2018/0284441 A1 | 10/2018 | Cobb | |
| 2020/0012110 A1 | 1/2020 | Blum et al. | |
| 2020/0034257 A1 | 1/2020 | Mahmood et al. | |
| 2020/0342577 A1 | 10/2020 | Rodriguez et al. | |

OTHER PUBLICATIONS

WIPO: International Search Report and Written Opinion relating WO application No. PCT/CA2022/050519, dated Jun. 27, 2022.

\* cited by examiner

*Primary Examiner* — Bumsuk Won
*Assistant Examiner* — Grant A Gagnon

(57) ABSTRACT

The present invention discloses a mixed reality system comprising a display and an optical system that projects the image into a viewer's eye where the display is convex or a concave optical component. The display may further be comprising of smaller displays bunched together to create optical functions. In addition, the display pixels of further comprise of sub-pixels.

18 Claims, 3 Drawing Sheets

A    B

AR SYSTEM WITH HYBRID DISPLAY

FIELD OF THE INVENTION

The present invention pertains to an augmented reality (AR) system that projects information over the real world object. The same system can be used as a virtual reality (VR) system as well where all the images shown and visible to viewers are generated by the display. A system that can be used for both applications is sometimes called mixed reality (MR) system.

SUMMARY

The present disclosure disclosed a mixed reality system, the system comprising, a display, an optical system that projects an image into a viewer's eye where the display is shaped to be a convex or a concave optical component.

BRIEF DESCRIPTION OF THE DRAWINGS

The foregoing and other advantages of the disclosure will become apparent upon reading the following detailed description and upon reference to the drawings.

Figure 1:
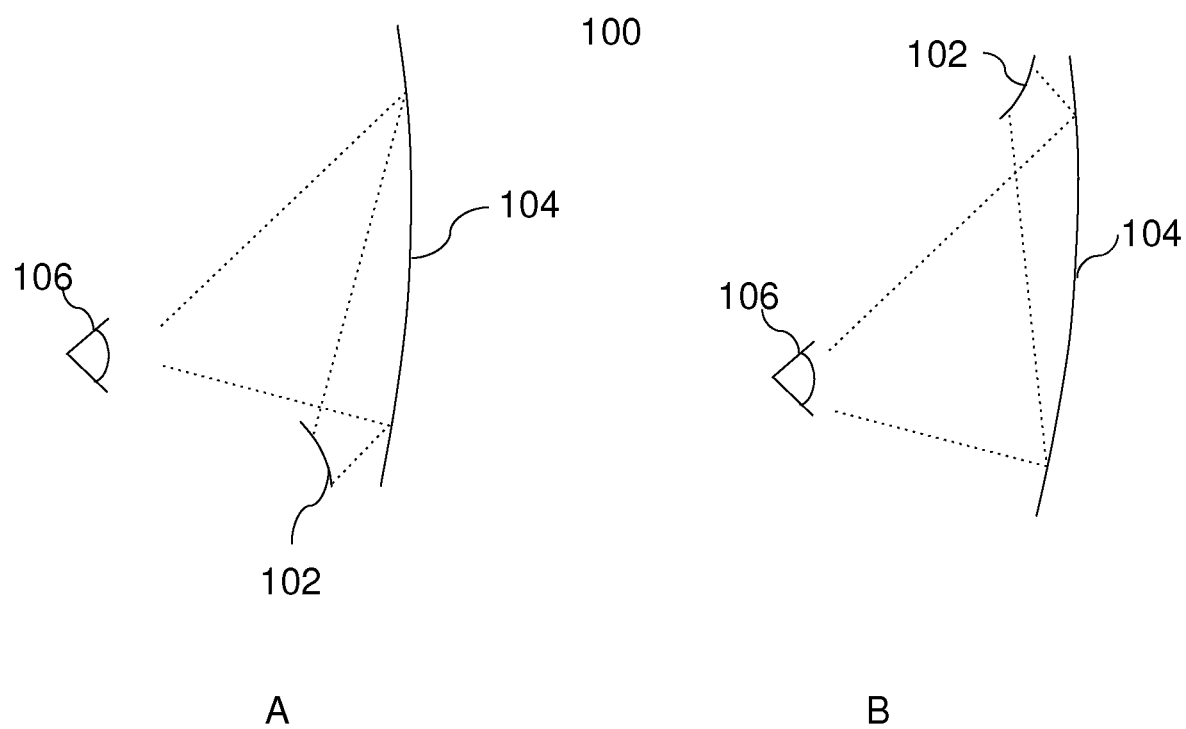
FIG. 1 shows one related embodiment of using display as an optical component.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION OF THE INVENTION

An augmented reality (AR) system projects information over the real world object. The same system can be used as a virtual reality (VR) system as well where all the images shown and visible to viewers are generated by the display. A system that can be used for both applications AR and VR is sometimes called mixed reality (MR).

The main parts of AR, VR, or MR systems are displays, optics, interfaces, and computing systems. The interface is used to interact with the user and also with the information sources. The display creates the images, and the optical system enables the image to be presented as augmented or virtual reality for the user. While interfaces and computing systems can be hidden away from the face, the optical system and displays are mainly on the face of the viewers. Therefore, having a compact structure for the optical system and displays is essential for ease of use.

In one embodiment, a display is shaped as one of the optical components. Here, the display can be flexible and molded into the optical structure shape.

FIG. 1 shows one related embodiment of using display as an optical component. Here, an MR system 100 has a convex curved display 102 and a concave or linear mirror 104 projecting the light from the display 102 into a viewer's eye 106. The mirror 104 can be a flat with pinhole optics. The mirror 104 can be semi-reflective or holographic. The display 102 can have micro-lenses for confining the light.

The radius of the curved display 102 and the concave mirror 104 are designed to provide the magnification, and focal distance. The display 104 can be curved in all directions or only curved in one direction. This direction can be in perpendicular with the mirror edge that the curved display 102 is close to. As a result, the image will be magnified in one direction only.

In one embodiment, the magnification by optics and display curvature is done in one direction. As a result, the display is elongated/stretched in a direction that is close to the edge of the mirror to increase the use of the field of view.

Figure 2A:
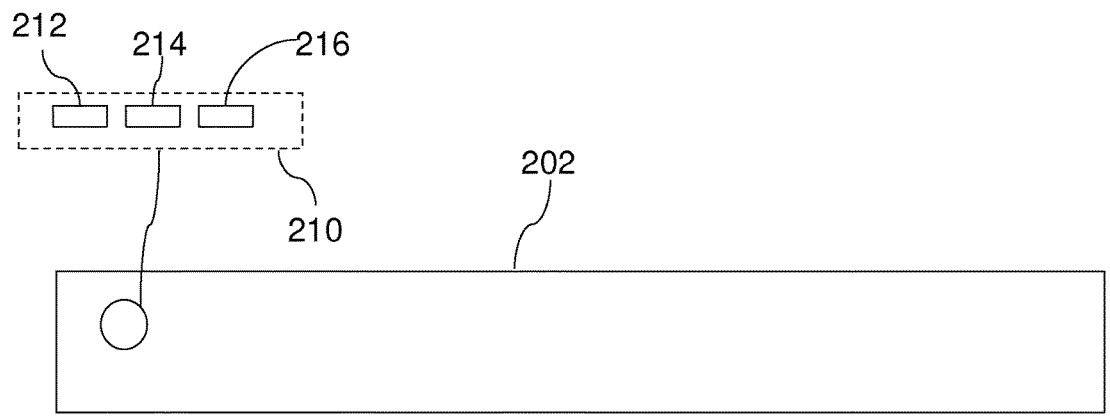
FIG. 2A shows a stretched display in one direction.

FIGS. 2 (2A and 2B) shows the curved display pixels 210 that can be stretched in one direction for example in the direction parallel to the edge of the mirror close to the display 102. FIG. 2A shows a stretched display 202 in one direction and one pixel 210 consists of multiple sub-pixels 212, 214 and 216. The pixel 210 is stretched in the same direction as the display 102. Also, the sub-pixels can be stretched or spaced sparsely to compensate for the extra space created by the stretched structure.

Figure 2B:
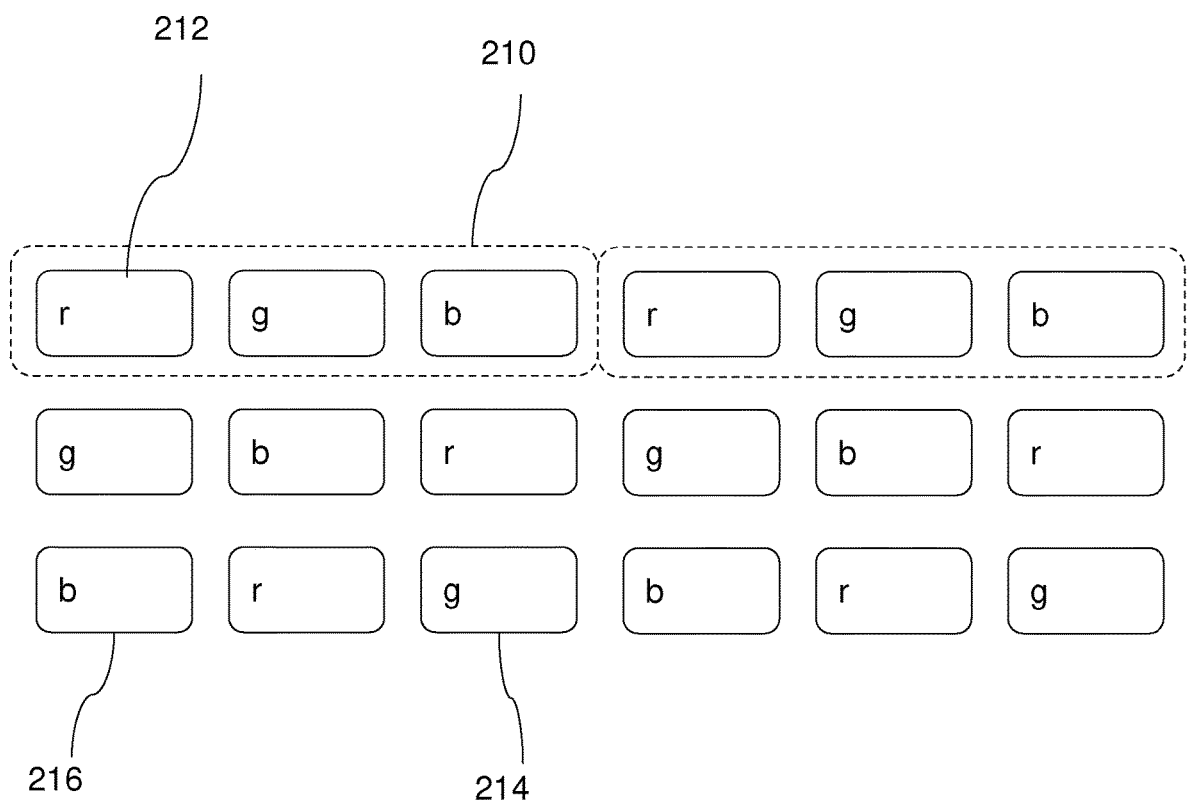
FIG. 2B shows the sub-pixels can be arranged so that there is no similar sub-pixel adjacent vertically and horizontally.

As shown in FIG. 2B, to increase the effective resolution, the sub-pixels can be arranged so that there is no similar sub-pixel adjacent vertically and horizontally. Stretching can be done as part of the fabrication and design. Here, the display is designed with longer pixels in one direction. In another case, the display is stretched after fabrication.

Figure 3:
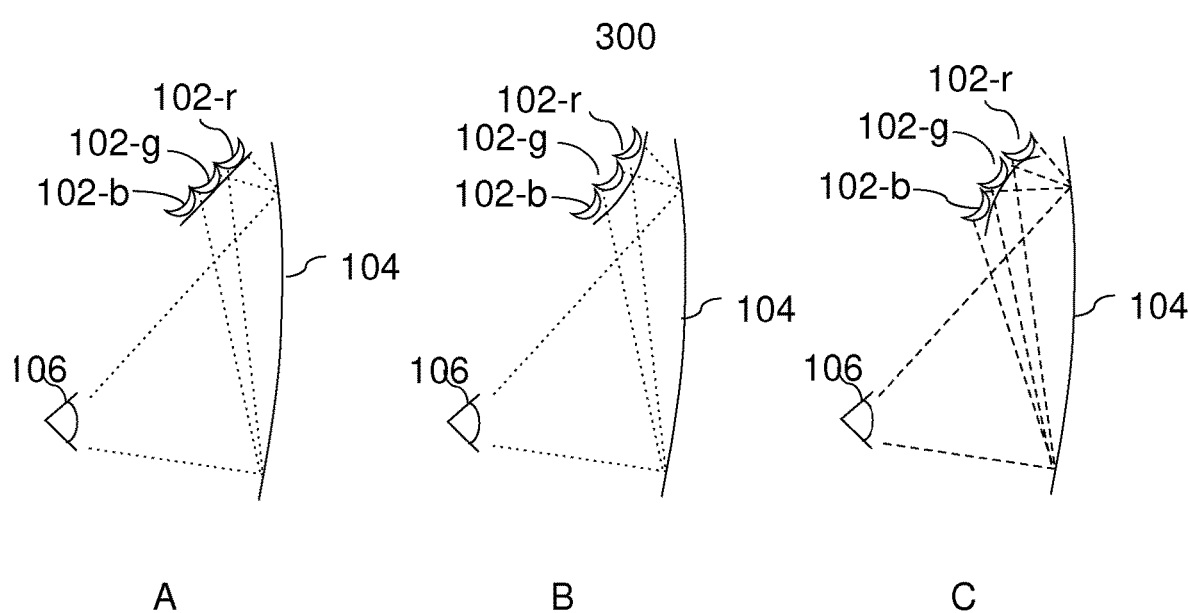
FIG. 3 shows more than one display can be used to create the image on the optical component.

In another related case demonstrated in FIG. 3, more than one display 102r, 102g, and 102b, can be used to create the image on the optical component 104. The displays 102r, 102g, and 102b can be arranged as part of the optical structure. In one related case, the displays can be linear arrangements. In another case, the displays are formed either as concave, convex or combination of both. Here the displays 102r 102g 102b can be different colors and so the combination of the displays and projection from the mirror 104 shows the full color. Here, to align the pixels from each display with each other, a test image is shown by each display and reflected on the mirror. The position of each pixel in the display is calculated in the mirror 104. The pixels in the displays that have close proximity in the mirror are grouped as one combined pixel. The image is remapped to each display based on the new grouping.

While the present disclosure is susceptible to various modifications and alternative forms, specific embodiments or implementations have been shown by way of example in the drawings and are described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

The invention claimed is:
1. A mixed reality system, the system comprising:
a display; and
an optical system that projects an image into a viewer's eye where the display is shaped to be a convex or a concave optical component, and wherein the display is curved in all directions or only curved in one direction, and wherein curved display pixels are stretched in a direction parallel to the edge of a mirror close to the display wherein one pixel comprises multiple sub-pixels and wherein the pixel is stretched in the same direction as the display and the sub-pixels are stretched to compensate for an extra space created by the stretched structure.

2. The system of claim 1, wherein the optical system comprises at least one reflective surface.

3. The system of claim 1, wherein the display is molded to a predefined nonlinear surface.

4. The system of claim 1, wherein the display comprises pixels where the pixels are longer in one direction.

5. The system of claim 1, wherein the display is mounted along an edge of the optical system.

6. The system of claim 1, wherein the display comprises several smaller displays.

7. The system of claim 6, wherein the smaller displays are arranged in a form to create optical functions.

8. The system of claim 1, wherein the display has a convex curved display and a concave or a linear mirror projecting the light from the display into the viewer's eye.

9. The system of claim 8, wherein the linear mirror is flat with pinhole optics.

10. The system of claim 8, wherein the linear mirror is semi-reflective or holographic and the display has micro-lenses for confining the light.

11. The system of claim 1, wherein the direction is perpendicular with a mirror edge that the curved display is close to.

12. The system of claim 1, wherein the sub-pixels are arranged so that there is no similar sub-pixel adjacent vertically and horizontally.

13. The system of claim 1, wherein the stretching is done as part of the fabrication and design wherein the display is designed with a longer pixel in one direction.

14. The system of claim 7, wherein the displays are formed either as concave, convex or combination of both.

15. The system of claim 14, wherein the displays are different colors and the combination of the displays and projection from the mirror shows a full color.

16. The system of claim 15, wherein pixels from each display with each other are aligned when a test image is shown by each display and reflected on the mirror.

17. The system of claim 16, wherein a position of each pixel in the display is calculated in the mirror.

18. The system of claim 17, wherein the pixels in the displays that have close proximity in the mirror are grouped as one combined pixel and the image is remapped to each display based on the new grouping.

* * * * *